United States Patent [19]

Doniwa

[11] Patent Number: 4,587,839
[45] Date of Patent: May 13, 1986

[54] TOP DEAD CENTER MEASUREMENT FOR RECIPROCATING CRANK MECHANISM

[75] Inventor: Tabito Doniwa, Hachioji, Japan
[73] Assignee: Daiichi Dentsu Kabushiki Kaisha, Chofu, Japan
[21] Appl. No.: 627,409
[22] Filed: Jul. 3, 1984
[30] Foreign Application Priority Data Jul. 4, 1983 [JP] Japan ............................. 58-120350

[51] Int. Cl.[4] .......................................... G01M 15/00
[52] U.S. Cl. .............................. 73/117.2; 33/DIG. 15
[58] Field of Search ...................... 73/116, 117.2, 118, 73/119 R; 33/DIG. 15; 364/551

[56] References Cited

U.S. PATENT DOCUMENTS 3,820,386 6/1974 Grikscheit et al. ................. 73/116
4,433,572 2/1984 Sundeen ............................. 73/116

Primary Examiner—Jerry W. Myracle
Attorney, Agent, or Firm—Robert E. Burns; Emmanuel J. Lobato; Bruce L. Adams

[57] ABSTRACT

A method or system for measuring the top dead center for a reciprocating crank mechanism, in which a reversible counter performs the additive counting operation from an amount H of shift of the piston of the reciprocating crank mechanism to another amount H of the shift of the piston in a reverse driving direction of the crankshaft of the reciprocating crank mechanism at both sides of a minimum shift of the piston, for each predetermined unit rotational angle deviation of the crankshaft. The reversible counter performs the subtractive counting operation from said another amount H of the shift of the piston in one driving direction of the crankshaft for each one half the predetermined unit rotational angle deviation of the crankshaft. A position of the piston is decided as the top dead center when the counting state of the reversible counter reached zero in said one driving direction of the crankshaft.

1 Claim, 13 Drawing Figures

TOP DEAD CENTER MEASUREMENT FOR RECIPROCATING CRANK MECHANISM

BACKGROUND OF THE INVENTION

The present invention relates to top dead center measurement.

It is well known in the art that it is necessary, in a final assembly step of an engine, to accurately determine an angle of a crankshaft to a connecting rod when the amount of shift of a piston into a cylinder is minimum. However, there has not yet been proposed suitable method or system in the art to accurately determine this angle.

SUMMARY OF THE INVENTION

An object of the invention is to provide a top center measurement control method or system for accurately determining a top dead center of a piston in a reciprocating slider crank mechanism for use in an internal combustion engine or the like of a motor vehicle.

In accordance with the present invention, there is proposed a method or system for measuring the top dead center for a reciprocating crank mechanism, in which a reversible counter performs the additive counting operation from an amount H of shift of the piston of the reciprocating crank mechanism to another amount H of the shaft of the piston in a reverse driving direction of the crankshaft of the reciprocating crank mechanism, for each predetermined unit rotational angle deviation of the crankshaft. The reversible counter performs the subtractive counting operation from said another amount H of the shift of the piston in one driving direction of the crankshaft for each one half the predetermined unit rotational angle deviation of the crankshaft. A position of the piston is decided as the top dead center when the counting state of the reversible counter reached zero in said one driving direction of the crankshaft.

BRIEF DESCRIPTION OF THE ACCOMPANYING DRAWINGS

The present invention will be described in detail below with reference to the accompanying drawings, in which.

DETAILED DESCRIPTION

Figure 1A:
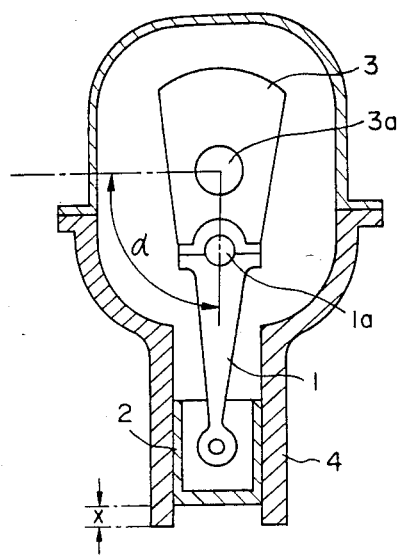
FIGS. 1A and 1B are sectional views of an engine block.
Figure 1B:
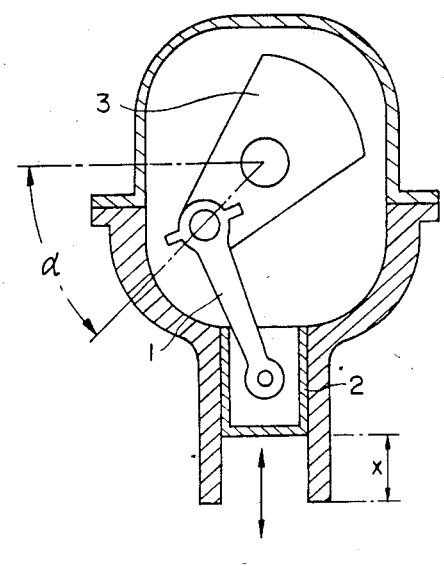

FIG. 1 is a sectional view of an engine block. It is well known in the art that it is necessary, in a final assembling step of an engine, to accurately determine an angle $\alpha$ of a crankshaft 3 to a connecting rod 1 when the latter assumes such a vertical position as shown in FIG. 1, that is, when the amount of shift x of a piston 2 into a cylinder is minimum. It seems, however, that there has not been any available measuring equipment capable of determining the angle $\alpha$ with accuracy. In FIG. 1, reference numeral 4 indicates an engine block, and $\alpha$ represents an angle between a horizontal line passing through the axis 3a and a line joining the center of a big end portion 1a of the connecting rod 1 and the axis 3a of the crankshaft 3.

Figure 2A:
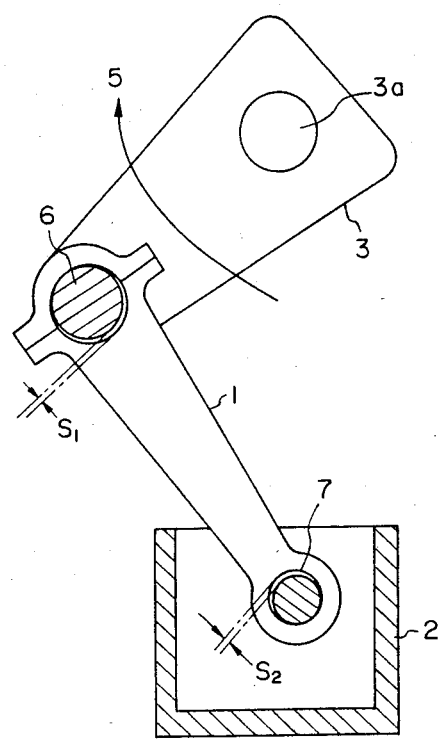
FIGS. 2A and 2B are diagrams showing the movement of a crankshaft and a connecting rod.
Figure 2B:
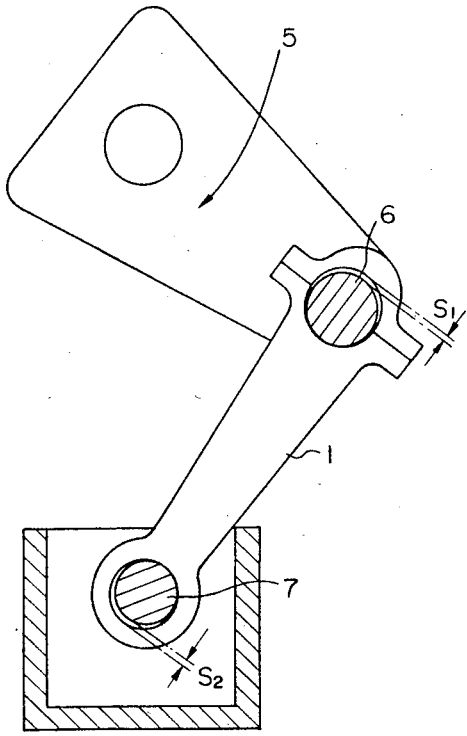

The amount of shift x of the piston 2 increases with a decrease in the rotational angle $\alpha$ of the crankshaft 3. FIG. 2 is a diagram generally showing the rotation of the crankshaft 3 and the motion of the connecting rod 1 caused by a stroke of the piston 2. When the amount of shift x of the piston 2 is almost minimum as shown in FIG. 1A, the amount of change in the rotational angle $\alpha$ of the crankshaft 3 increases with respect to the amount of change in the amount of shift x. Accordingly, even if the rotational angle of the crankshaft 3 is measured when the amount of shift x is minimum, an error is very large. Another cause is as follows: A gap $S_1$ between the connecting rod 1 and a crank pin 6 and a gap $S_2$ between the connecting rod 1 and a piston pin 7 appear on opposite sides according to the direction of rotation 5 of the crankshaft 3, as shown in FIGS. 2A and 2B, so that if the resulting errors are added together, it will be inaccurate to determine the angle $\alpha$ if the crankshaft 3 when the amount of shift x of the piston 2 is minimum, that is, when the piston 2 lies at its top dead center. The present invention eliminates such an error.

Figure 3A:
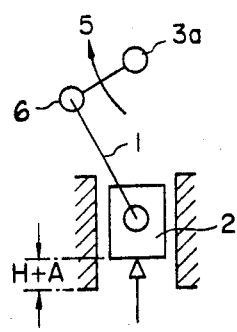
FIGS. 3A-3E are diagrams explanatory of the principles of the present invention.
Figure 3B:
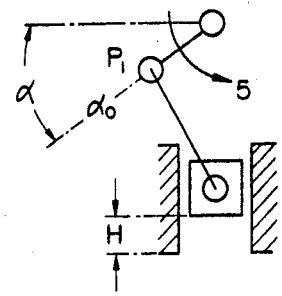
Figure 3C:
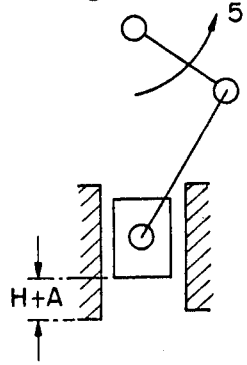
Figure 4:
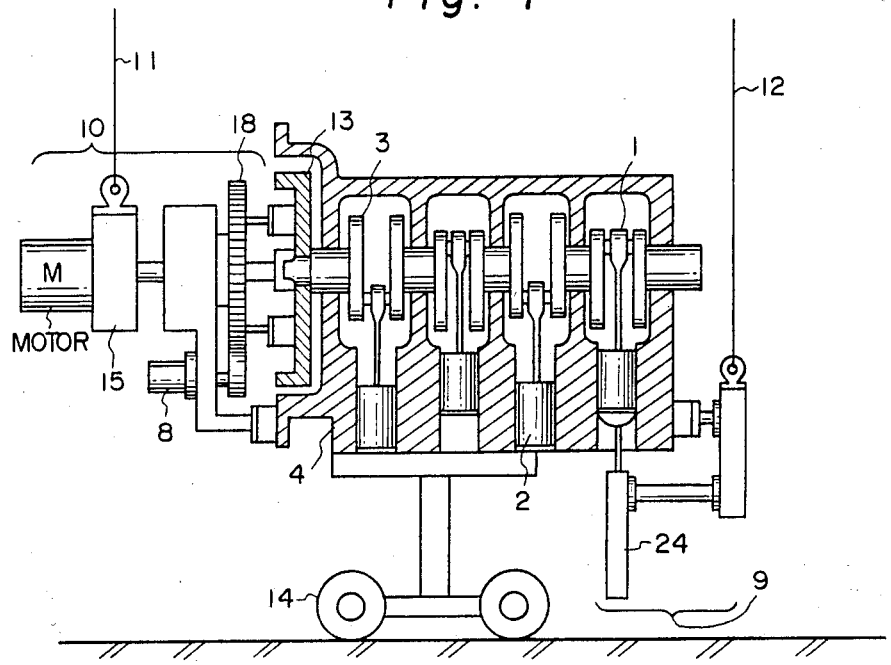
FIG. 4 is a diagram illustrating an embodiment of the present invention.
Figure 5:
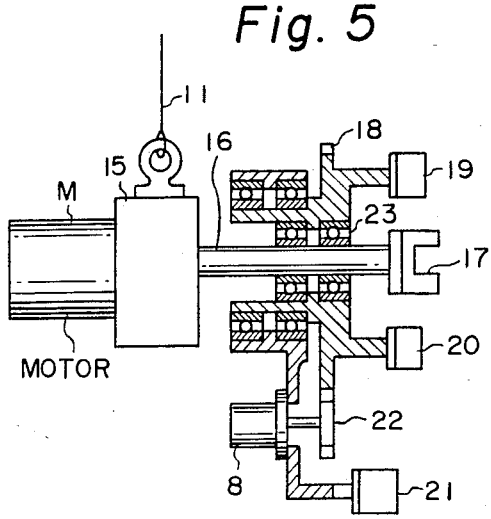
FIG. 5 is a diagram, partly in section, illustrating the construction of a drive unit in FIG. 4.
Figure 6:
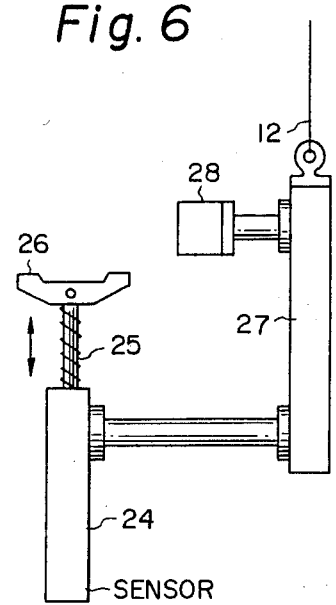
FIG. 6 is a diagram showing an arrangement example of a sensor unit used in the present invention.

A description will be given first of the principles of the present invention. A rotational angle detector (an encoder generating a pulse for each unit angle deviation, such as one minute) 8 for the crankshaft 3 and a sensor unit 9 for detecting the amount of x of the piston 2 are mounted on the engine block 4, as shown in FIGS. 4 to 6 (which will be described later), and the crankshaft 3 is turned first to the right (clockwise), as shown in FIG. 3A. When the position (=x) of the piston 2 has reached a height (H+A), the crankshaft 3 is stopped. Then the crankshaft 3 is turned to the left (counterclockwise), as shown in FIG. 3B, and when the position of the piston 2 has reached a height H, the content of a counter of the encoder 8 is made zero. The crankshaft 3 is further turned to the left, as shown in FIG. 3C, and when the position of the piston 2 has reached the height (H+A), the crankshaft 3 is stopped. Incidentally, it is desirable that the height H be selected at an angle position $\alpha_0$ such that the amount of change in the value of H is maximum with respect to the amount of change in the rotational angle, and the value of H can easily be obtained by computation. The value of A is optional.

Figure 3D:
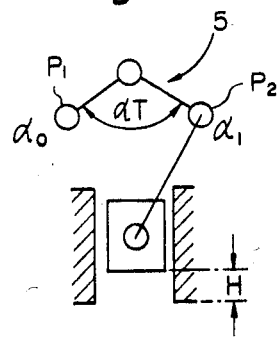
Figure 3E:
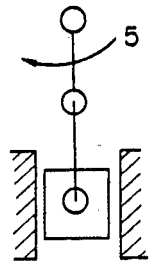

Next, the crankshaft 3 is turned again to the right, as shown in FIG. 3D, and when the position of the piston 2 has reached the height H (i.e. an angle position $\alpha_1$), the number of amount-of-shift pulses for each unit angle deviation to the counter of the encoder 8 is doubled (described later with regard to FIG. 6). The crankshaft 3 is stopped when the content of the counter has become zero after further rightward rotation of the crankshaft 3, as shown in FIG. 3E. The position of the piston 2 at this time is its exact top dead center. Since the piston 2 has the height H in both cases where the crankpin 6 is at a point $P_1$ in FIG. 3B and where the crankpin 6 is at a point $P_2$ in FIG. 3D, a position corresponding to an angle equal to $\frac{1}{2}$ of a rotational angle $\alpha T$ (FIG. 3D)

from the point $P_1$ to the point $P_2$ is the top dead center. In an embodiment of the invention, with a view to simplifying a control circuit used, by performing a multiple subtraction when the crankshaft 3 has reached to point $P_2$, the connecting rod 1 is stopped at the angle position equal to ½ of the angle $\alpha T$.

FIG. 4 illustrates the outline of an embodiment of the present invention as applied to the engine block (shown in section). The device of the present invention comprises a sensor unit 9 for sensing the amount of shift of the piston 2 and a driving unit 10, and their arrangements are such as shown in FIGS. 6 and 5, respectively. In FIG. 4, reference numerals 11 and 12 designate wire ropes suspended, for instance, from the ceiling of a workroom, for facilitating a transfer of the driving unit 10 and the sensor unit 9 and their mounting on the engine block. Reference numeral 13 identifies a flywheel, which is mounted on the shaft of the crankshaft 3, and 14 a truck for moving the engine block 4.

The driving unit 10 has such a construction as shown in FIG. 5, in which the turning effort of a motor M, reduced by a reduction gear 15, is transmitted to the crankshaft 3 through a hook 17 attached to the tip of a shaft 16 and engaged with the axis of the crankshaft 3. On the other hand, magnets 19 and 20, as a unitary structure with a gear 18, mesh with an encoder pinion 22, transmitting the rotational angle (of the flywheel 13→ the crankshaft 3) to the encoder 8. The magnets 19 and 20 stick fast to the flywheel 13 firmly engaged with the crankshaft 3, and the magnet 21 sticks fast to the engine block body 4. Such an arrangement is made that the elements 18 to 22 are not engaged with the motor shaft 16 through ball bearings 23. The reason for this is that the shaft 16 of the motor M and the shaft of the crankshaft 3 may engage with a little play, but it is required to accurately transmit to the encoder 8 the rotation of the flywheel 13 which accurately transmits the rotation of the crankshaft 3.

The sensor unit 9 has such a construction as shown in FIG. 6, in which a contactor 26 is mounted on the top of a sensor 24, which makes contact with the head of the piston 2. The contactor 26 is pushed up by the spring force of a spring 25 into contact with the piston 2 at a proper pressure. Reference numeral 27 denotes a block which supports the sensor 24 and a magnet 28 and sticks fast to the outside of the engine block by virtue of the magnet 28, securing the sendor body. As the sensor unit 9, a known displacement sensor is used for detecting the amount of shift of the piston 2.

Figure 7:
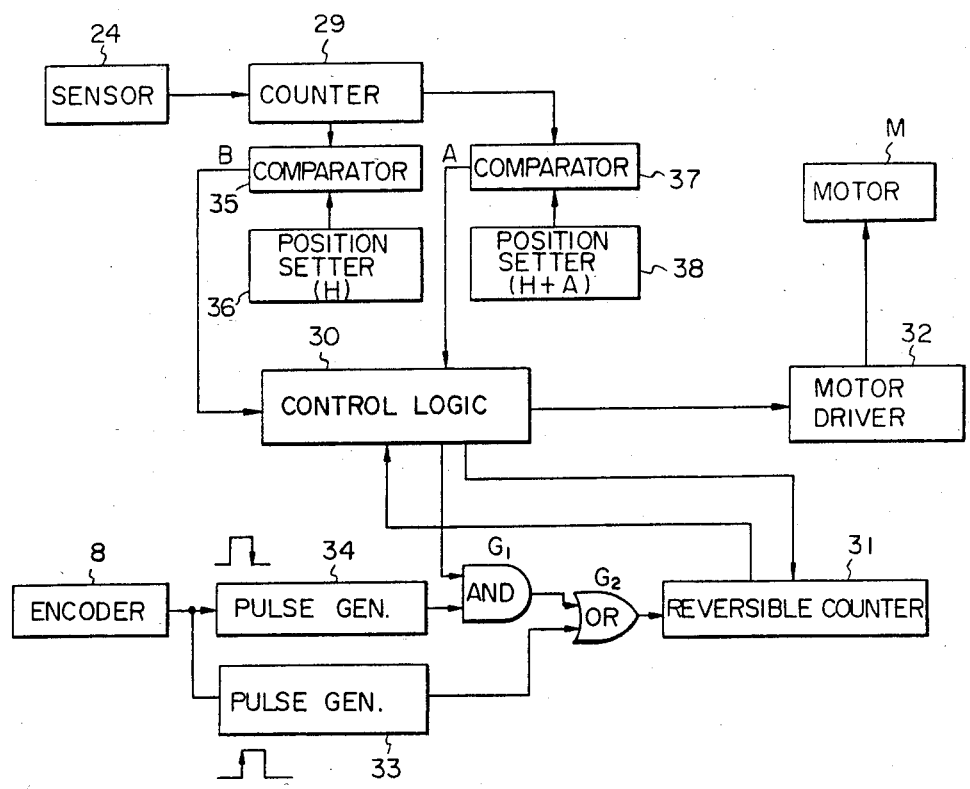
FIG. 7 is a connection diagram of an electrical circuit for top dead center measurement control in the present invention.

FIG. 7 is an electrical circuit connection diagram for top dead center measurement control showing motor driving by the sensor unit 9 and the driving unit 10. In FIG. 7, a reversible counter 31 is designed to perform an adding operation and a subtracting operation during counterclockwise and clockwise rotations of the crankshaft 3, respectively. At first, an output is provided from a control logic 30 to a motor driving circuit 32 to turn the motor M clockwise. At this time, the sensor 24 always detects a movement of the piston 2 and generates pulses having the number corresponding to the amount of movement, and a counter 29 counts the number of pulses corresponding to the height of the piston 2. (For the following description, refer to FIG. 3.)

(1) When the height of the piston 2 has reached a value (H+A), a comparator (A) 37 generates an A-signal output on the basis of coincidence with an (H+A) output from a position setter 38, causing the control logic 30 to deliver a signal for driving the motor M counterclockwise.

(2) When the height of the piston 2 has lowered to a value H as a result of the counterclockwise rotation of the motor M, as shown in FIG. 3B, a comparator (B) 35 provides a B-signal to the control logic 30 on the basis of coincidence between an H output from a position setter 36 and the H output from the counter. The control logic 30 performs a sequence operation, and hence does not respond to the output from the comparator (B) based on the passage of the piston through the height H in the case of (1). Upon reception of the output from the control logic 30, the reversible counter 31 resets its added value (during counterclockwise rotation of the crankshaft 3) to zero.

Now, a description will be given of an output circuit of the encoder 8 in FIG. 7. The encoder 8 generates, in succession, rectangular waves having the number corresponding to the rotational angle of the crankshaft 3, as described previously, and a pulse generator (A) 33 and a pulse generator (B) generate, at different time points, A-pulses by the front edge timings of the encoder output pulses and B-pulses by their rear edge timings, respectively, for input into an OR gate $G_2$ and AND gate $G_1$. Since the gate $G_1$ is normally closed, only the A-pulses from the circuit (A) are counted by the reversible counter 31.

(3) The motor M is further rotated counterclockwise and an addition operation is carried out correspondingly after resetting of the counter 31, and when the piston 2 rises to the height (H+A), as shown in FIG. 3C, the control logic 30 is activated by the output signal from the comparator (A) 37 to carry out a third operation, rotating the motor M clockwise. In this case, the B-output is also provided when the piston 2 is at the height H, but the control logic 30 does not respond thereto.

(4) When a subtraction operation is effected and the piston 2 lowers to the height H, as shown in FIG. 3D, the control logic 30 is activated by the output from the comparator (B) 35 to perform a fourth operation, opening the AND gate $G_1$. Upon application of both of the A- and B-pulses, the counter 31 starts a twice-fast subtraction (a multiple subtraction) in comparison with a case where only the input from the pulse generator (A) 33 is applied to the counter 31.

(5) The clockwise rotation of the motor M is further continued and when the count value of the reversible counter 31 becomes zero, the control logic 30 performs a fifth operation, suddenly stopping the motor M and consequently the piston 2. This position of the piston 2 is the top dead center shown in FIG. 3E. In this way, the top dead center is automatically determined with high accuracy.

As will be appreciated from the foregoing description, the present invention permits an accurate determination of the top dead center, through the use of a relatively simple device, and produces an excellent effect.

What I claim is:

1. A method for measuring top dead center for a reciprocating crank mechanism, comprising:
    first step for driving the crankshaft of the reciprocating mechanism in one direction and then driving the same in the reverse direction when the amount of shift of the piston has reached the predetermined value H+A;
    second step for resetting to zero the counting state of a reversible counter when the amount of shift of the position has reduced the predetermined value H in the reverse driving direction of the crankshaft;

third step for starting and additively counting the counting state of the reversible counter after the resetting thereof for each predetermined unit rotational angle deviation of the crankshaft until the amount of shift of the piston has reached the predetermined value H+A in the reverse driving direction of the crankshaft;

fourth step for again driving the crankshaft in said one driving direction when the amount of shift of the piston has reached the predetermined value H+A;

fifth step for subtractively performing the counting operation of the reversible counter for each predetermined unit rotational angle deviation of the crankshaft until the amount of shift of the piston has reached the predetermined value H in said one driving direction of the crankshaft;

sixth step for subtractively performing the counting operation of the reversible counter for each one-half the predetermined unit rotational angle deviation of the crankshaft after the amount of the shift of the piston has reached the predetermined value H in said one driving direction of the crankshaft; and seventh step for deciding a position of the piston as the top dead center when the counting state of the reversible counter reaches zero in said one driving direction of the crankshaft.

* * * * *